United States Patent
Dewa et al.

(10) Patent No.: US 7,149,427 B1
(45) Date of Patent: Dec. 12, 2006

(54) COOPERATING ARRAY OF MICROMIRROR DEVICES FOR WIRELESS OPTICAL COMMUNICATION

(75) Inventors: Andrew S. Dewa, Plano, TX (US); Robert C. Keller, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 629 days.

(21) Appl. No.: 10/024,321

(22) Filed: Dec. 14, 2001

Related U.S. Application Data

(60) Provisional application No. 60/256,427, filed on Dec. 18, 2000.

(51) Int. Cl.
*H04J 14/00* (2006.01)

(52) U.S. Cl. .............................. 398/52; 398/55; 398/56; 385/18

(58) Field of Classification Search .................. 385/18; 398/45, 52, 55, 56
See application file for complete search history.

(56) References Cited

U.S. PATENT DOCUMENTS

| | | | |
|---|---|---|---|
| 6,430,332 B1 * | 8/2002 | Laor et al. ..................... 385/18 |
| 6,445,844 B1 * | 9/2002 | Neukermans et al. .......... 385/18 |
| 6,543,286 B1 * | 4/2003 | Garverick et al. ........ 73/514.18 |
| 6,681,063 B1 * | 1/2004 | Kane et al. .................... 385/18 |

* cited by examiner

*Primary Examiner*—David C. Payne
(74) *Attorney, Agent, or Firm*—William B Kempler; W. James Brady, III; Frederick J. Telecky, Jr.

(57) ABSTRACT

A micromirror array assembly (10, 20) for use in optical modules (5, 17) in a wireless network system is disclosed. The micromirror array assembly (10, 20) includes a plurality of mirrors (29) monolithically formed with a frame (43), attached by way of hinges (55) and gimbal portions (45). Permanent magnets (53) are attached to each of the gimbal portions (45) associated with the mirrors (29). The resulting frame (43) is then mounted to a coil driver assembly (50) so that coil drivers (34) can control the rotation of each mirror (29), under separate control from control circuitry (14, 24). The micromirror array assembly (10, 20) is thus able to support higher signal energy at larger spot sizes, and also enables multiplexed transmission and receipt, as well as sampling of the received beam for quality sensing. A method of manufacturing the micromirror array assembly (10, 20) is also disclosed, in which a support wafer (60) is temporarily bonded to the mirror wafer (70) while the permanent magnets (53) are attached.

28 Claims, 6 Drawing Sheets

COOPERATING ARRAY OF MICROMIRROR DEVICES FOR WIRELESS OPTICAL COMMUNICATION

This application claims priority under 35 USC. § 119 (e)(1) of Provisional Application No. 60/256,427, filed Dec. 18, 2000.

CROSS-REFERENCE TO RELATED APPLICATIONS

This application is related to copending provisional application Ser. No. 60/256,424 (TI-41588P), filed contemporaneously herewith, entitled "Method of Fabricating a Cooperating Array of Rotatable Microstructure Devices", and commonly assigned herewith.

STATEMENT REGARDING FEDERALLY SPONSORED RESEARCH OR DEVELOPMENT

Not applicable.

BACKGROUND OF THE INVENTION

This invention is in the field of optical communications, and is more specifically directed to micromirror assemblies as used in such communications.

Modern data communications technologies have greatly expanded the ability to communicate large amounts of data over many types of communications facilities. This explosion in communications capability not only permits the communications of large databases, but has also enabled the digital communications of audio and video content. This high bandwidth communication is now carried out over a variety of facilities, including telephone lines (fiber optic as well as twisted-pair), coaxial cable such as supported by cable television service providers, dedicated network cabling within an office or home location, satellite links, and wireless telephony.

Each of these conventional communications facilities involves certain limitations in their deployment. In the case of communications over the telephone network, high-speed data transmission, such as that provided by digital subscriber line (DSL) services, must be carried out at a specific frequency range to not interfere with voice traffic, and is currently limited in the distance that such high-frequency communications can travel. Of course, communications over "wired" networks, including the telephone network, cable network, or dedicated network, requires the running of the physical wires among the locations to be served. This physical installation and maintenance is costly, as well as limiting to the user of the communications network.

Wireless communication facilities of course overcome the limitation of physical wires and cabling, and provide great flexibility to the user. Conventional wireless technologies involve their own limitations, however. For example, in the case of wireless telephony, the frequencies at which communications may be carried out are regulated and controlled; furthermore, current wireless telephone communication of large data blocks, such as video, is prohibitively expensive, considering the per-unit-time charges for wireless services. Additionally, wireless telephone communications are subject to interference among the various users within the nearby area. Radio frequency data communication must also be carried out within specified frequencies, and is also vulnerable to interference from other transmissions. Satellite transmission is also currently expensive, particularly for bidirectional communications (i.e., beyond the passive reception of television programming).

A relatively new technology that has been proposed for data communications is the optical wireless network. According to this approach, data is transmitted by way of modulation of a light beam, in much the same manner as in the case of fiber optic telephone communications. A photoreceiver receives the modulated light, and demodulates the signal to retrieve the data. As opposed to fiber optic-based optical communications, however, this approach does not use a physical wire or waveguide for transmission of the light signal. In the case of directed optical communications, a line-of-sight relationship between the transmitter and the receiver permits a modulated light beam, such as that produced by a laser, to travel without the waveguide of the fiber optic.

It is contemplated that the optical wireless network according to this approach will provide numerous important advantages. First, high frequency light can provide high bandwidth, for example ranging from on the order of 100 Mbps to several Gbps, using conventional technology. This high bandwidth need not be shared among users, when carried out over point-to-point line-of-sight optical communications between transmitters and receivers. Without the other users on the link, of course, the bandwidth is not limited by interference from other users, as in the case of wireless telephony. Modulation can also be quite simple, as compared with multiple-user communications that require time or code multiplexing of multiple communications. Bi-directional communication can also be readily carried out according to this technology. Finally, optical frequencies are not currently regulated, and as such no licensing is required for the deployment of extra-premises networks.

These attributes of optical wireless networks make this technology attractive both for local networks within a building, and also for external networks. Indeed, it is contemplated that optical wireless communications may be useful in data communication within a room, such as for communicating video signals from a computer to a display device, such as a video projector.

It will be apparent to those skilled in the art having reference to this specification that the ability to correctly aim the transmitted light beam to the receiver is of importance in this technology. Particularly for laser-generated collimated beams, which can have quite small spot sizes, the reliability and signal-to-noise ratio of the transmitted signal are degraded if the aim of the transmitting beam strays from the optimum point at the receiver. Especially considering that many contemplated applications of this technology are in connection with equipment that will not be precisely located, or that may move over time, the need exists to precisely aim and controllably adjust the aim of the light beam.

Copending application Ser. No. 09/310,284, filed May 12, 1999, entitled "Optical Switching Apparatus", commonly assigned herewith and incorporated herein by this reference, discloses a micromirror assembly for directing a light beam in an optical switching apparatus. As disclosed in this application, the micromirror reflects the light beam in a manner that may be precisely controlled by electrical signals. As disclosed in this patent application, the micromirror assembly includes a silicon mirror capable of rotating in two axes. One or more small magnets are attached to the micromirror itself; a set of four coil drivers are arranged in quadrants, and are current-controlled to attract or repel the micromirror magnets as desired, to tilt the micromirror in the desired direction. These single micromirror assemblies in the optical transmitter modules provide good communications in many applications.

However, practical and regulatory limits on the power density of the transmitted beam in turn limit the signal energy that may be communicated using these single beam steering elements. For example, an important power density limit is that defining the "eye-safe" power density of the transmitted beams; use of a power density above this limit requires significant facility modifications (e.g., warning lights, eye protection, etc.), which are inconsistent with use of the system for data communications in office and building-to-building environments. Reduction of the power density of the transmitted beam by increasing the beam cross-sectional diameter requires a corresponding increase in the size of the micromirror beam steering element. As known in the telescope art, however, the construction of accurate mirrors with larger diameters is an increasingly difficult task. As such, according to conventional technology, it becomes very costly to increase the signal power of an optical communications beam while maintaining the power density below safety and other limits.

BRIEF SUMMARY OF THE INVENTION

It is therefore an object of the present invention to provide a mirror assembly, and methods of fabricating and using the same, that can accurately steer a relatively large optical beam in the communication of optical data.

It is a further object of the present invention to provide such an assembly that is suitable for use in both the transmission and receipt of data over the optical beam.

It is a further object of the present invention to provide such an assembly having redundancy in the mirror assembly.

It is a further object of the present invention to provide such an assembly having improved focusing of the optical signal beam.

It is a further object of the present invention to provide such an assembly having improved resolution in the steered optical beam.

It is a further object of the present invention to provide such an assembly that may divert a portion of a received signal beam for use in feedback and control of the mirror assembly.

It is a further object of the present invention to provide such an assembly that may steer received optical signal beams from multiple sources to a single detector.

It is a further object of the present invention to provide such an assembly that may reflect a part of the received optical beam to the transmitting source to provide feedback and tracking.

It is a further object of the present invention to provide such an assembly that may provide a detector with a reduced focal length.

These and other objects and advantages of the present invention will be apparent to those of ordinary skill in the art having reference to the following specification together with its drawings.

The present invention may be implemented into a mirror assembly arranged as an array of micromirrors controlled in a cooperative manner. The array of micromirrors may be fabricated in a monolithic manner at a surface of a silicon wafer. Each micromirror is attached by integral hinges to gimbals and a mounting frame, to permit rotation of each micromirror in two axes. One or more permanent magnets are attached to each micromirror, and the array of micromirrors is mounted to an array of individually controlled magnetic coils. Control of the magnetic coils is then effected to cooperatively operate the individual micromirrors in the array to produce the desired control effect.

DETAILED DESCRIPTION OF THE INVENTION

The present invention will be described in connection with its preferred embodiments, with an example of an application of these preferred embodiments in a communications network. It is contemplated, however, that the present invention may be realized not only in the manner described below, but also by way of various alternatives which will be apparent to those skilled in the art having reference to this specification. It is further contemplated that the present invention may be advantageously implemented and used in connection with a variety of applications besides those described below. It is therefore to be understood that the following description is presented by way of example only, and that this description is not to be construed to limit the true scope of the present invention as hereinafter claimed.

Figure 1:
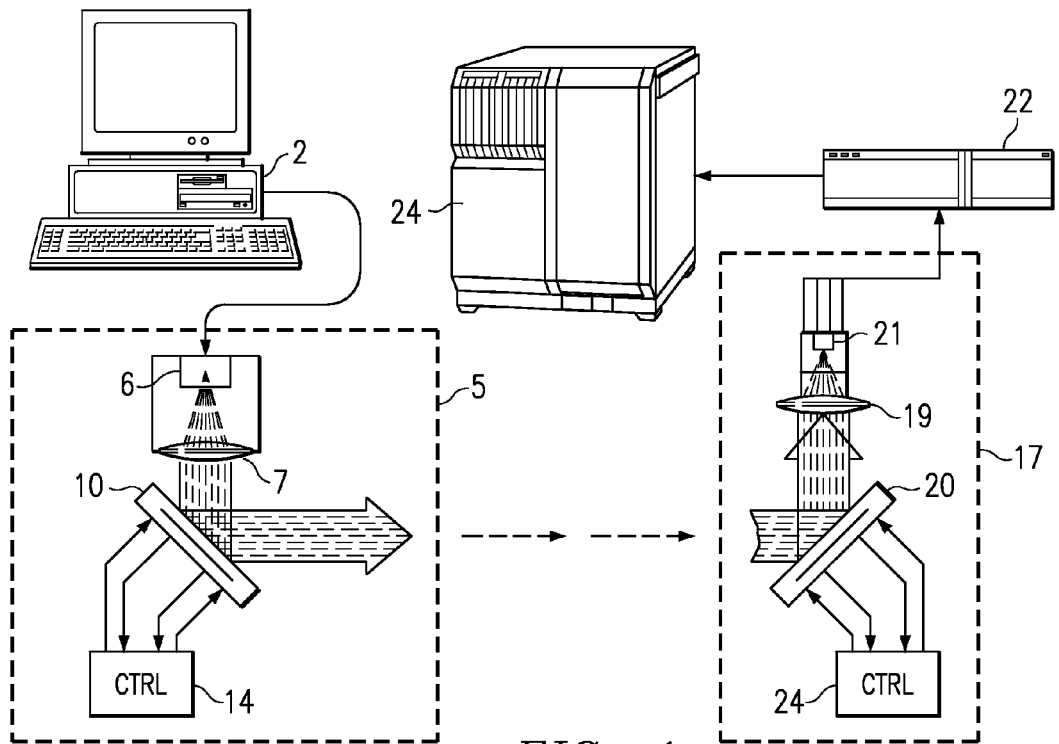
FIG. 1 is a schematic drawing of an optical wireless network using a micromirror assembly, according to the preferred embodiment of the invention, in both the transmission and receive legs.

Referring first to FIG. 1, an example of an optical wireless network will be illustrated, to provide context for the present invention. In this simple example, unidirectional communications are to be carried out from computer 2 to server 20, by way of modulated directed light. In this example, computer 2 is a conventional microprocessor based personal computer or workstation, including the appropriate network interface adapter for outputting the data to be communicated. Computer 2 is connected to transmitter optical module 5, which both aims a directed light beam at the desired receiver optical module 17, and modulates the light beam to communicate the data.

Alternatively, the transmitting source may be a network switch or router, a source of video data such as a DVD player or a television set-top converter box, or the like, rather than computer 2 as shown. It is contemplated that the present invention may be used in connection with effectively any source of digital data.

In this example, transmitter optical module 5 includes modulating laser 6, which generates a collimated coherent light beam of the desired wavelength (e.g., 850 nm) and power. Modulating laser 6 modulates this light beam according to the digital data being transmitted. The modulation scheme used preferably follows a conventional data communications standard, such as those used in connection with fiber optic network data communications. Lens 7, according to this preferred embodiment of the invention, spreads the laser beam produced by laser 6 into a relatively large spot size, so that the resulting output power density is below the appropriate safety limit (e.g., on the order of 500 $\mu W/cm^2$ or less, measured at the transmitter exit). The spot size of the laser beam exiting lens 7 can be as large as desired, for example up to on the order of several centimeters in diameter.

This spread beam is reflected from micromirror array assembly 10 toward receiver optical module 17. The construction of micromirror array assembly 10 according to the preferred embodiments of the invention will be described in further detail below. For purposes of this general description of FIG. 1, control circuitry 14 is provided to direct the orientation of micromirror array assembly 10, and the individual micromirrors in assembly 10, to achieve the particular operation and performance desired. This control and operation of micromirror array assembly 10 will be described in further detail below.

On the receiver end, receiver optical module 17 captures the incoming directed light beam, and converts the modulated light energy to an electrical signal. In this example, receiver optical module 17 includes its own micromirror array assembly 20, which is similarly constructed as micromirror array assembly 10 in transmitter optical module 5, as will be described below. Micromirror array assembly 20 is controlled by control circuitry 24 to steer, direct, and optionally focus the incoming optical beam to lens 19, which in turn further focuses the optical beam to photodiode 21. Photodiode 21 and its accompanying circuitry (such as demodulators, filters, and the like, not shown) modulates an electrical signal in response to the intensity of incoming light. The demodulated communicated electrical signal is then forwarded from receiver optical module 17 to router 22, and thus into the receiving network, for eventual distribution to server 24, in this example.

As evident from FIG. 1 and the foregoing description, this example illustrates a unidirectional, or simplex, communications approach, for ease of this description. It will be appreciated by those skilled in the art that bidirectional, or duplex, communications may be carried out by providing another transmitter-receiver pair for communicating signals in the opposite direction (router 22 to computer 2). Additionally, this example illustrates the use of micromirror array assemblies 10, 20 at both the transmit and receive ends of the network; it is of course contemplated that the present invention may alternatively be embodied into a system where the micromirror array assembly is implemented at only one end of the communication, with conventional optical devices (e.g., a single or no micromirror) deployed at the other end.

The communications arrangement of FIG. 1 may be utilized in connection with a wide range of applications, beyond the simple computer-to-network example suggested by FIG. 1. For example, it is contemplated that each of multiple computers in an office or other workspace may communicate with one another and with a larger network by way of modulated light to a central receiver within the room, and also between rooms by way of relayed communications along hallways or in a space frame. These applications include both point-to-point communications, and also communications between a point location (e.g., a workstation) and a multipoint location (e.g., a network hub). Other indoor applications for this optical wireless communications may include the communication of video signals from a computer or DVD player to a large-screen projector. It is further contemplated that optical wireless communications in this fashion may be carried out in this manner but on a larger scale, for example between or among buildings, and between an outdoor point location such as a building, and a multipoint location such as transceivers deployed on a tower.

The aim of micromirror array assemblies 10, 20 must be precisely controlled to successfully direct the modulated laser beam to receiver optical module 17 and lens 19, respectively, and thus optimize the signal-to-noise ratio of the transmitted signals. It is contemplated that this precision positioning is preferably accomplished by way of calibration and feedback, so that the mirror is able to sense its position and make corrections. Control circuitry 14, 24 are provided to control the operation of micromirror array assemblies 10, 20, respectively, in response to control and feedback signals, as will also be described in further detail below.

Figure 2A:
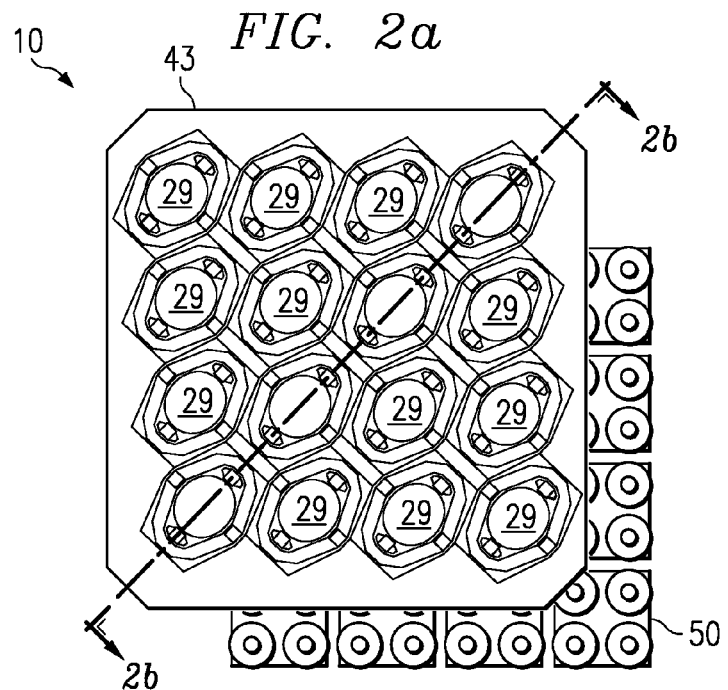
FIG. 2a is an exploded view of a micromirror array assembly according to the preferred embodiments of the invention.
Figure 2B:
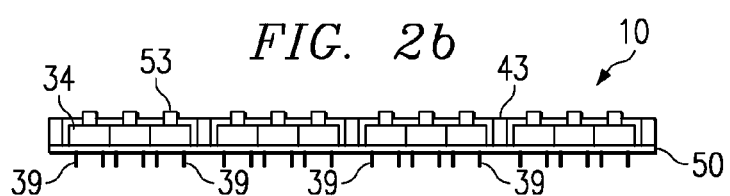
FIG. 2b is a cross-sectional view of the micromirror array assembly of FIG. 2a, according to the preferred embodiments of the invention.
Figure 2C:
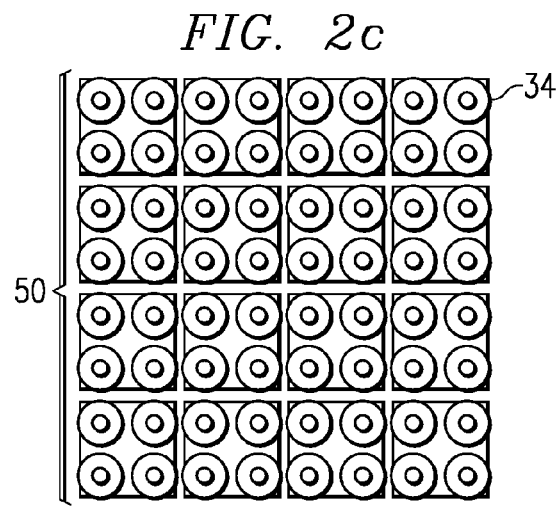
FIG. 2c is a plan view of the coil driver array of the micromirror assembly of FIG. 2a, according to the preferred embodiments of the invention.

Referring now to FIGS. 2a through 2c, the construction of micromirror array assembly 10 according to the preferred embodiment of the invention will now be described in detail. Micromirror array assembly 20 in receiver optical module 17 is contemplated to be similarly constructed as micromirror array assembly 10, and as such its construction will not be separately described.

As shown in the exploded view of FIG. 2a, micromirror array assembly 10 includes frame 43 of mirrors 29. In this example, mirrors 29 are arranged in a four-by-four closely-packed arrangement; it will be understood, of course, that the particular array size and arrangement of frame 43 may vary from that shown, without departing from the present invention. For example, it is contemplated that up to on the order of one hundred mirrors 29 may be deployed in a single array.

Each mirror 29 is monolithically integrated with and attached to frame 43, all formed of a single silicon element, as will be described below. Four permanent magnets 53 are attached to frame 43 in association with each mirror 29. In this example of micromirror array assembly 10, each permanent magnet 53 is mounted to overlie a corresponding coil driver 34 of coil driver array 50, as shown in the cross-sectional view of FIG. 2b. As illustrated in the plan view of FIG. 2c, one coil driver 34 is associated with each permanent magnet 53, and coil drivers 34 are arranged in groups of four to correspond to the four permanent magnets 53 of a mirror 29. Electrical connection to each coil driver 34 is provided by one or more leads 39, so that each coil driver 34, and thus each mirror 29, may be individually controlled, separately from the other micromirror surfaces 29 if so desired. Such control will be described in further detail below.

Alternatively, other arrangements of permanent magnets 53 may be deployed. For example, it is contemplated that a single permanent magnet 53 may be attached to the underside of mirror 29; the four coil drivers 34 associated with the mirror 29 would, in this case, be controlled to deflect the single magnet 53 and thus rotate mirror 29 about the two axes. This implementation, as well as other alternative realizations, will be apparent to those skilled in the art having reference to this specification.

FIGS. 3 and 3a through 3d illustrate an individual mirror element 41 of micromirror array assembly 10 in further detail. Mirror element 41 includes an intermediate gimbals portion, and an inner mirror portion, all preferably formed from one piece of crystal material, such as silicon, along with frame 43. In its fabrication, silicon is etched to provide frame 43, forming an opening in which intermediate annular gimbals portion 45 is attached at opposing hinge locations 55 along first axis 31. Inner, centrally disposed mirror body 47, a surface of which serves as mirror 29, remains attached to gimbals portion 45 at hinge portions 55 on a second axis 35, 90 degrees from the first axis. Mirror body 47, which is on the order of 100 microns in thickness, is suitably polished on its upper surface to provide the specular surface of mirror 29. Preferably, this polished surface is plated with a metal, such as aluminum or gold, to provide further reflectivity. In order to provide necessary flatness, each mirror 29 is formed with a radius of curvature greater than approximately 2 meters, with increasing optical path lengths requiring increasing radius of curvature. The radius of curvature can be controlled by known stress control techniques, by polishing, and by deposition techniques for stress controlled thin films. If desired, one or more coatings of suitable material can be placed on the mirror portion to enhance its reflectivity for specific radiation wavelengths.

Individual mirror element 41 includes a first pair of permanent magnets 53 mounted on gimbals portion 45 along the second axis, and a second pair of permanent magnets 53 mounted on extensions 51, which extend outwardly from mirror body 47 along the first axis. In order to symmetrically distribute mass about the two axes of rotation to thereby minimize oscillation under shock and vibration, each permanent magnet 53 preferably comprises a set of an upper magnet 53a mounted on the top surface of the mirror element 41 using conventional attachment techniques such as indium bonding, and an aligned lower magnet 53b similarly attached to the lower surface of the mirror assembly as shown in FIGS. 3a through 3d. The magnets of each set are arranged serially such as the north/south pole arrangement indicated in FIG. 3c. There are several possible arrangements of the four sets of magnets which may be used, such as all like poles up, or two sets of like poles up, two sets of like poles down; or three sets of like poles up, one set of like pole down, depending upon the magnetic characteristics desired for the expected arrangement of coil drivers 34.

The mounting of gimbals portion 45 to frame portion 43 by means of hinges 55 provides motion of the gimbals portion 45 about the first axis 31, and the mounting of mirror body 47 to gimbals portion 45 via hinges 55 provides motion of the mirror portion relative to the gimbals portion about the second axis 35. Mirror element 41 according to the preferred embodiment of the invention may therefore be controlled to independently rotate mirror 29 about two orthogonal axes.

Figure 3:
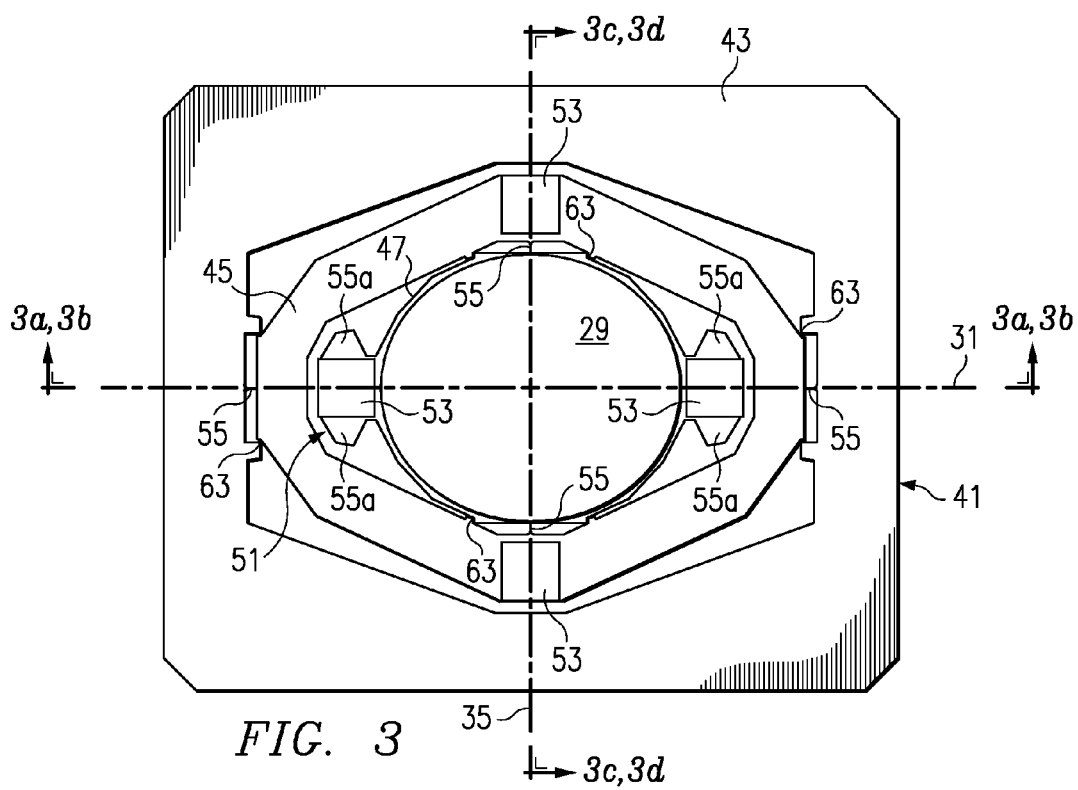
FIG. 3 is a plan view of a mirror element in the micromirror array assembly according to the preferred embodiments of the invention.
Figure 3A:
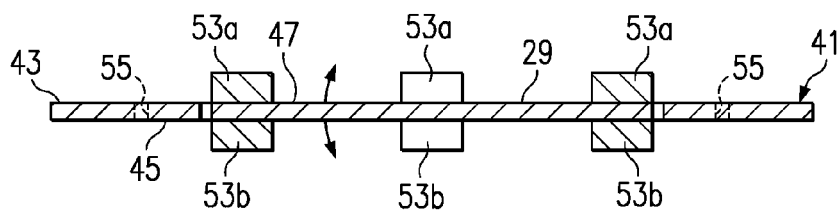
FIGS. 3a through 3d are cross-sectional views of the mirror element of FIG. 3, illustrating its operation.
Figure 3B:
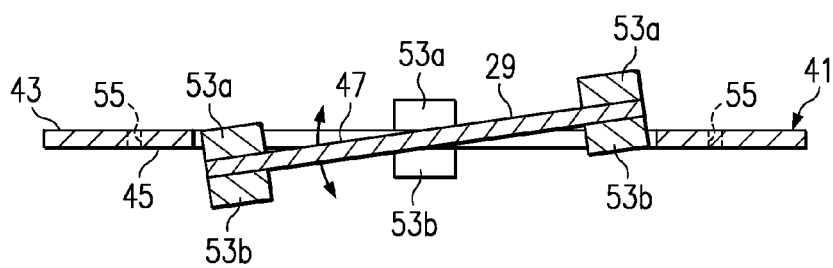
Figure 3C:
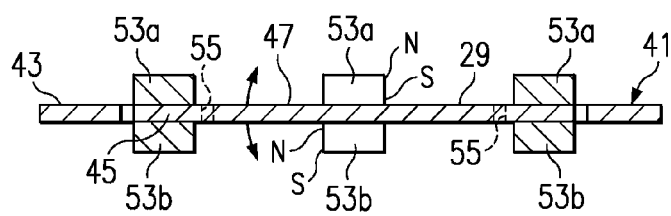
Figure 3D:
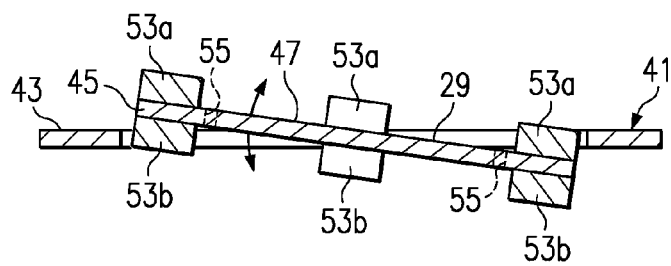

The middle or neutral position of mirror element 41 is shown in FIG. 3a, which is a section taken through the assembly along line A—A of FIG. 3. Rotation of mirror body 47 about axis 35 independent of gimbals portion 45 and/or frame portion 43 is shown in FIG. 3b as indicated by the arrow. FIG. 3c shows the middle position of the mirror element 41, similar to that shown in FIG. 3a, but taken along line B—B of FIG. 3. Rotation off the gimbals portion 45 and mirror body 47 about axis 31 independent of frame portion 43 is shown in FIG. 3d as indicated by the arrow. The above independent rotation of mirror 29 of mirror body 47 about the two axes allows direction of the modulated optical beam as needed by the optical switch units.

In order to protect hinges 55 from in-plane shock during handling and shipping, stops 57 may be provided, as described in the above-incorporated application Ser. No. 09/310,284. According to another optional feature of the invention, lock down tabs associated with each hinge 55 are provided, also as described in the above-incorporated application Ser. No. 09/310,284.

As shown in FIG. 3, extensions 51 are preferably provided with laterally extending tabs 51a, which can be used to clamp down the mirror portion during assembly to provide additional stress protection.

A method of fabricating frame 43 with an array of mirrors 29 as described above, and the mounting of permanent magnets 53 to frame 43, according to the preferred embodiment of the invention will now be described in detail. This embodiment of the invention takes advantage of the arrangement of mirrors 29 in an array, and their simultaneous fabrication in wafer form, to also mount permanent magnets 53 at the wafer level. It has been observed, in connection with the present invention, that a primary cause of yield loss in the manufacture of micromirror assemblies is the mechanical damage of the micromirrors during attachment of the permanent magnets. In particular, it has been observed that the integrated torsional hinges are frequently damaged during the placement of the individual micromirror elements into chip trays or other fixtures in which the permanent magnets are attached according to conventional methods. Indeed, it has been observed that a drop of a micromirror from a height of only 1 to 2 mm is enough to break a hinge. According to the present invention, as will now be described, mounting of the permanent magnets may be accomplished at the wafer level, greatly reducing the likelihood of damage to the integrated torsional hinges.

While this embodiment of the invention will be described in connection with the fabrication of a micromirror array assembly, it will be understood by those skilled in the art having reference to this specification that this method of fabrication may be used to advantage in fabricating other micromirror assemblies, including individual micromirrors, for example by dicing the micromirrors from the wafer after attachment of their corresponding permanent magnets. Further, the process according to this embodiment of the invention is generally applicable to the formation of microstructures other than micromirrors.

In general, according to this preferred embodiment of the invention, a carrier wafer is fabricated for use in combination with a mirror layer from which the micromirrors are formed. This carrier wafer defines the locations at which the permanent magnets are attached to the mirror wafer, and also supports the mirror wafer during the attachment of the permanent magnets at these locations.

Figure 4A:
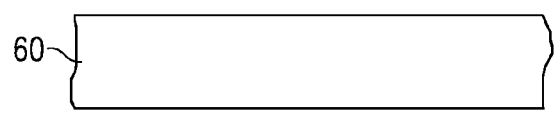
FIGS. 4a through 4e are cross-sectional views.
Figure 4B:
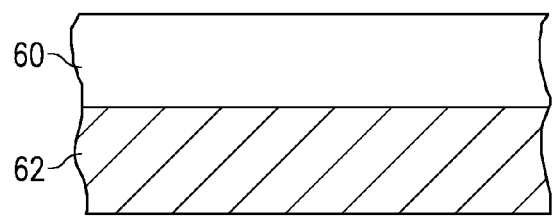

Referring now to FIGS. 4a through 4f, the fabrication of carrier wafer 60 according to this preferred embodiment of the invention will now be described. FIG. 4a illustrates a cross-section of an operative portion of carrier wafer 60 in its initial starting state. For example, carrier wafer 60 may be a 375μ thick silicon wafer, polished on both sides; in this example, conventional semiconductor process techniques may be used to define the various features to be formed in silicon carrier wafer 60. As shown in FIG. 4b, carrier wafer 60 is then bonded to its own support wafer 62, which may be a silicon wafer of significant thickness, such as 15 mils, but which need not be polished on either side; support wafer 62 is simply used to support carrier wafer 60 during its processing, as will be described below. The bonding between carrier wafer 60 and support wafer 62 is preferably by way of a temporary releasable bonding agent, such as positive photoresist or wafergrip.

Figure 4C:
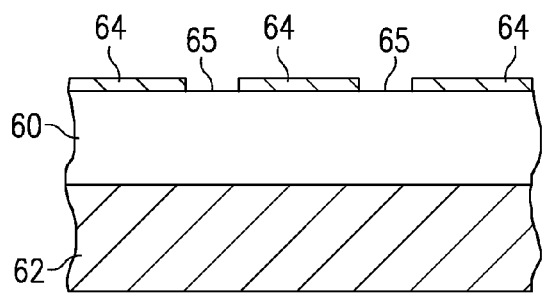
Figure 4D:
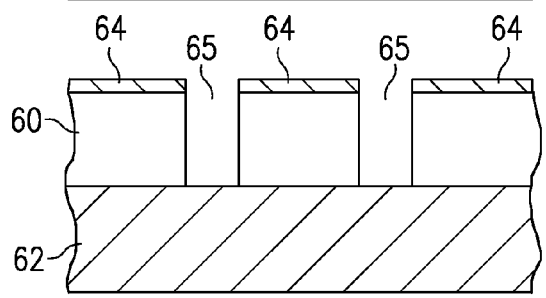
Figure 4E:
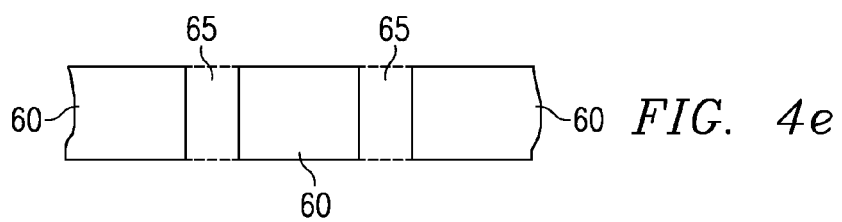
Figure 4F:
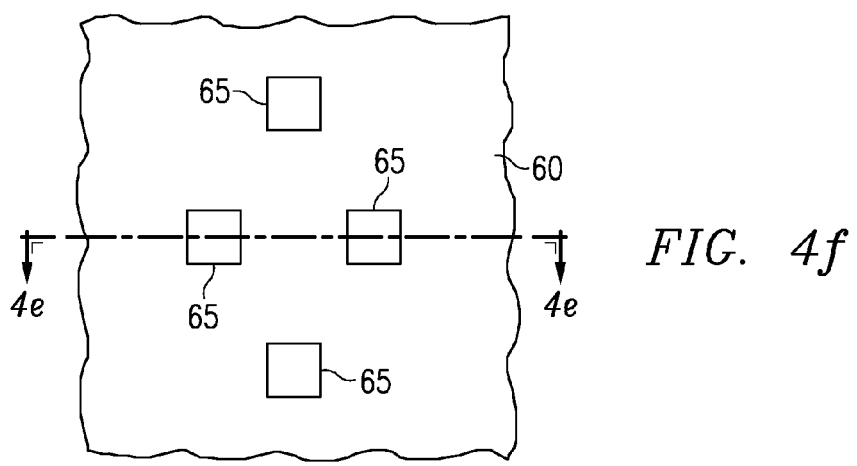
FIG. 4f is a corresponding plan view, illustrating the fabrication of a carrier wafer according to a preferred embodiment of the invention.

Permanent magnet locations 65 are then defined at the exposed surface of carrier wafer 60, by way of conventional photolithography. As shown in FIG. 4c, hard mask layer 64 is formed over this exposed surface of carrier wafer 60, and removed by way of photolithography to define openings at permanent magnet locations 65. A preferred material for hard mask layer 64 is silicon dioxide, preferably patterned using conventional photoresist-based photolithography techniques. Carrier wafer 60 is then subjected to an etch, preferably a reactive ion etch such as the conventional Bosch etch process, to etch permanent magnet locations 65 completely through carrier layer 60, as shown in FIG. 4d. This etch may be stopped once support wafer 62 is reached, although the precision of the stopping of the etch is not critical, as support wafer 62 is disposable and therefore may be itself etched to ensure clearing of locations 65 in carrier wafer 60. Support wafer 62 is then removed, to release carrier wafer 60. As a result of this etch, carrier wafer 60 is provided with openings completely through its thickness at, permanent magnet locations 65, as illustrated in FIGS. 4e and 4f.

Figure 5A:
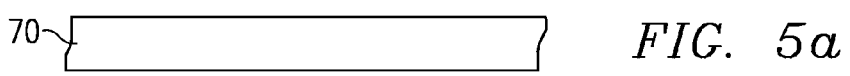
FIGS. 5a through 5e are cross-sectional views illustrating the fabrication of a mirror wafer in conjunction with the carrier wafer according to the preferred embodiment of the invention.
Figure 5B:
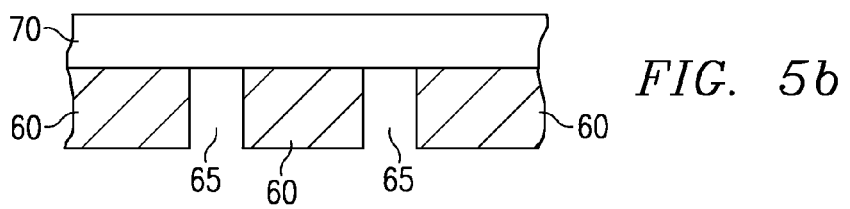

Referring now to FIGS. 5a through 5e, the fabrication of mirror wafer 70 according to the preferred embodiment of the invention, using carrier wafer 60 fabricated as described above, will now be described. In this exemplary embodiment, mirror wafer 70, a portion of which is shown in cross-section in FIG. 5a, is a double-side polished silicon wafer having the desired thickness for use in micromirror array assembly 10, for example on the order of 115μ thick. Mirror wafer 70 is bonded to carrier wafer 60 by way of a temporary releasable bonding agent, such as positive photoresist or wafergrip, providing the structure illustrated in FIG. 5b.

Figure 5C:
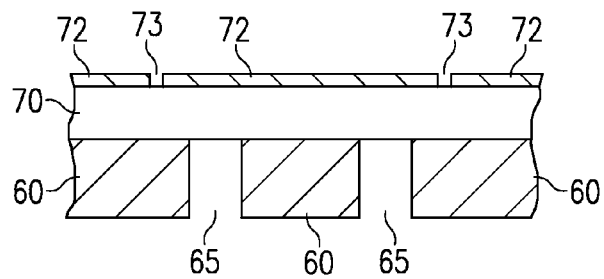
Figure 5D:
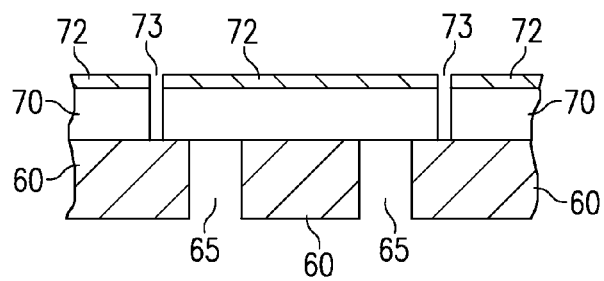
Figure 5E:
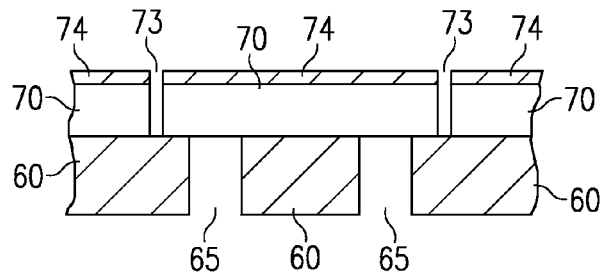

The features of frame 43 and mirrors 29, along with their associated gimbals 45 and hinges 55, are then formed in mirror wafer 70. According to this embodiment of the invention, mask layer 72 is formed at the exposed surface of mirror wafer 70. Mask layer 72 may be a hard mask formed of a durable material such as silicon dioxide, or alternatively may be photoresist. Hard mask layer 72 is then photolithographically patterned in the conventional manner for semiconductor integrated circuit manufacture, defining openings 73 corresponding to the locations separating the various features (frame 43, mirrors 29, gimbals 45, hinges 55, etc.). The locations of openings 73 are selected with registration to permanent magnet locations 65. Given the construction of frame 43 and its features, described above relative to FIG. 3, it is contemplated that none of openings 73 will overlie permanent magnet locations 65; rather, mirror wafer 70 is aligned with carrier wafer 60 so that permanent magnet locations 65 of carrier wafer 60 are aligned with corresponding expected locations of permanent magnets 53. The patterning of hard mask layer 72 is illustrated in FIG. 5c.

Once hard mask layer 72 is patterned, mirror wafer 70 is then etched to form openings 73 and thus define the desired features of frame 43. A preferred example of the etch used to form openings 73 is a reactive ion etch, for example according to the well-known Bosch process. Openings 73 are etched completely through the entire thickness of mirror wafer 70, resulting in the structure shown in FIG. 5d. Hard mask layer 72 is then removed from the surface of mirror wafer 70. According to this preferred embodiment of the invention, the surface of mirror wafer 70 is then plated with reflective material 74, for example gold, to provide the structure illustrated in FIG. 5e. At this stage in the process, mirror wafer 70 has its features defined to provide an array of micromirror elements 41, as shown in the plan views of FIGS. 2a and 3, and remains bonded to carrier wafer 60 as shown in the cross-sectional view of FIG. 5e.

Figure 6A:
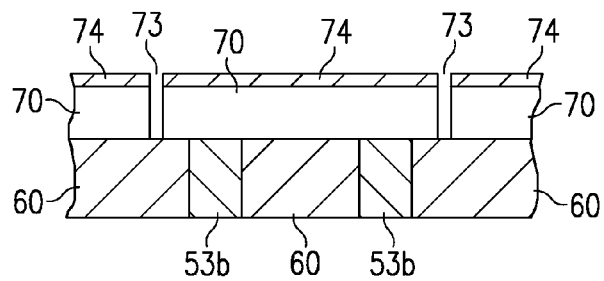
FIGS. 6a through 6c are cross-sectional views illustrating the mounting of permanent magnets to the mirror wafer using the carrier wafer, according to the preferred embodiment of the invention.
Figure 6B:
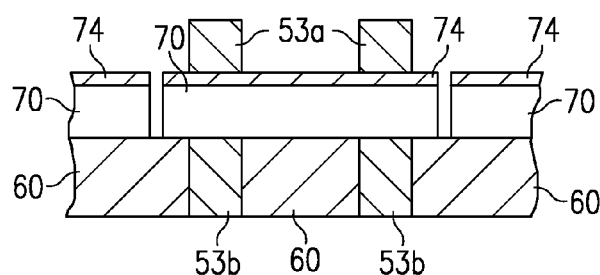
Figure 6C:
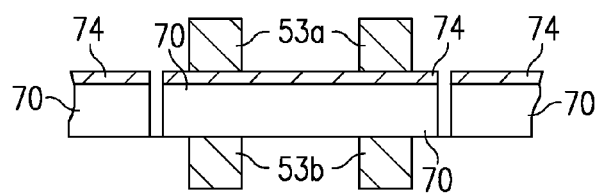

Referring now to FIGS. 6a through 6c, the mounting of permanent magnets 53 to mirror wafer 70, according to the preferred embodiment of the invention, will now be described. With carrier wafer 60 in place, as shown in FIG. 6a, lower permanent magnets 53b are bonded to mirror wafer 70, at the locations defined by openings 65 in carrier wafer 60. This bonding of magnets 53b is preferably a permanent bonding, for example by way of an epoxy. It is contemplated that the size of openings 65 may be formed with sufficient precision to precisely locate lower permanent magnets 53b at the appropriate locations of mirror wafer 70. As shown in FIG. 6b, with carrier layer 60 still in place, upper permanent magnets 53a are then bonded to mirror wafer 70, at locations opposing those of lower permanent magnets 53b. Carrier wafer 60 serves to prevent mechanical damage to mirror elements 41 in frame 43 during this mounting of upper permanent magnets 53a to mirror wafer 70. Magnets 53 can be poled either before or after attachment to mirror wafer 70.

Carrier wafer 60 may then be removed, once permanent magnets 53a, 53b are mounted, as illustrated in FIG. 6c. This releases mirror wafer 70, and mirror elements 41 and frame 43, for mounting to coil driver array 50 in the manner shown in FIG. 2a, for the completion of micromirror array assembly 10. Alternatively, as noted above, this method of fabrication may be used to mount permanent magnets 53 to individual mirror elements 41, in which case these elements 41 may now be diced from mirror wafer 70. In either case, magnets 53 are mounted to mirror elements 41 in wafer form, greatly reducing the risk of damage to the fragile mirror elements 41 while mounting magnets 53.

Figure 7:
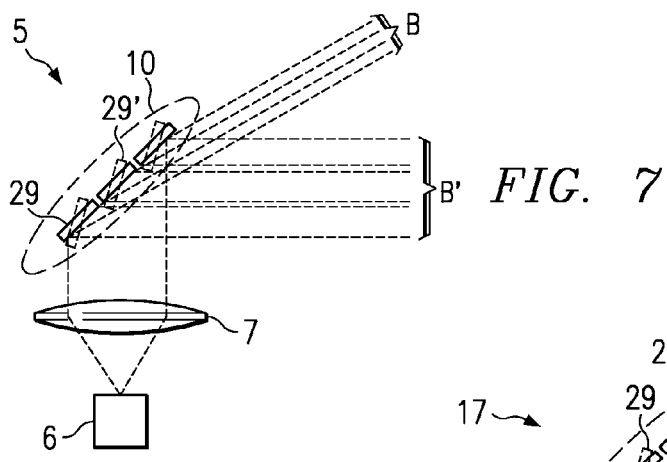
FIG. 7 is a schematic diagram illustrating the operation of a transmit optical module including a micromirror array assembly according to the preferred embodiment of the invention.

Referring now to FIG. 7, the operation of micromirror array assembly 10 in transmitter optical module 5 according to the preferred embodiment of the invention will now be described. FIG. 7 is a schematic illustration of the operable elements of transmitter optical module 5; it will be understood, of course, that other elements such as control circuitry 14 are also involved in this operation. As shown in FIG. 7, laser 6 is producing light output that is focused by lens 7 into a collimated laser beam. This light beam is directed to micromirror array assembly 10, which, according to the preferred embodiment of the invention, includes multiple mirrors 29 controlled in cooperation with one another to steer the light beam from lens 7 to the desired location. FIG. 7 illustrates the operation of mirrors 29 to steer, or direct, light beam B when controlled by control circuitry 14, via coil drivers 34 and permanent magnets 53 (not shown) into a deflected state. FIG. 7 also illustrates beam B' as directed by mirrors 29 when in a non-deflected, or null, state (shown by mirrors 29' in FIG. 7).

As illustrated by FIG. 7, therefore, micromirror array assembly 10 steers beam B, which, because of the use of multiple mirrors 29 permits a relatively large beam, in spot size, to be accurately steered with a relatively strong signal intensity, without violating regulatory or safety power density limits. The multiple smaller mirrors 29 may be produced at relatively low cost, compared to the construction and control of a larger mirror corresponding to this larger spot size. Not only is the manufacturing cost of micromirror array assembly 10 less than that of a similarly sized single mirror, but the range of the angle of deflection, and thus steerability, of the light beam is likely to be larger with micromirror array assembly 10 than with a corresponding single mirror.

Further in the alternative, micromirror array assembly 10 and transmitter optical module 5 may be implemented into a multipoint network element, such as a transmitter associated with a network hub. In such an arrangement, multiple lasers 6 and associated lenses 7 will produce multiple collimated laser beams, impinging micromirror array assembly 10 from different directions. In this implementation, control circuitry 14 will control micromirror array assembly 10 to direct the light beams to desired receivers in a time multiplexed manner; still further in the alternative, the multiple light beams may be directed to different regions of micromirror array assembly 10, with the regions being separately controlled to simultaneously reflect their associated light beams in different directions, to different receivers. It is contemplated that these and other alternative realizations of the present invention in transmitter optical modules will be apparent to those skilled in the art having reference to this specification.

Figure 8:
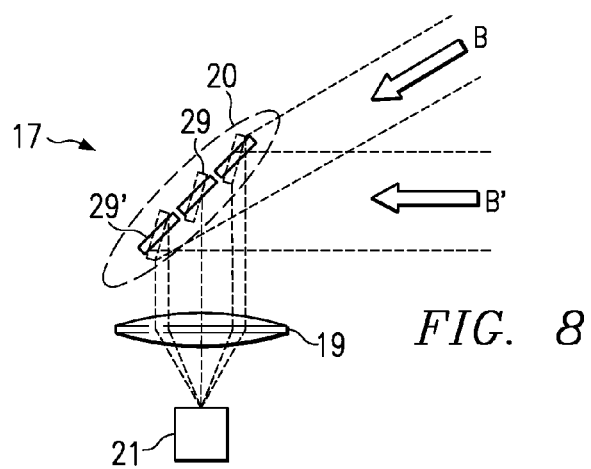
FIG. 8 is a schematic diagram illustrating the operation of a receiver optical module including a micromirror array assembly according to the preferred embodiment of the invention.

FIG. 8 schematically illustrates the operation of receiver optical module 17, including micromirror array assembly 20, operable under the control of control circuitry 24. As described above, receiver optical module 17 also includes lens 19 which focuses the received beam steered by micromirror array assembly 20 to photodiode 21. Photodiode 21 generates an electrical signal in response to the modulated light that it receives, and forwards this signal on to router 22 (FIG. 1) or other destination of the signal.

According to this preferred embodiment of the invention, micromirror array assembly 20 is controlled by control circuitry 24 (not shown in FIG. 8) to receive a modulated light beam from a selected source, and to steer this received light beam to lens 19. As shown in FIG. 8, micromirror array assembly 20 can receive incoming light over a wide angle of incidence. Beam B is steered to lens 19 by mirrors 29 when in a rotated position, as energized by the corresponding coil drivers 34 (not shown in FIG. 8); in the non-rotated position shown by mirrors 29' in FIG. 8, beam B' is directed to lens 19. As such, receiver optical module 17, including micromirror array assembly 20 constructed according to the preferred embodiment of the invention, provides a high degree of control and reception angle.

In contrast, a conventional fixed mirror would focus incoming received beams B, B' to different points at photodiode 21, necessitating a larger photodiode to receive a modulated signal beam from both directions. For high speed optical receivers, it is well known that the size of the photodiode limits the speed at which modulated light can be detected, and therefore a large photodiode limits the data transfer rate.

It is contemplated that this control of micromirror array assembly 20 by control circuitry 24 can allow for variations in the operation of receiver optical module 17. For example, modulated light beams B from multiple sources may be steered by micromirror array assembly 20 in a time-multiplexed fashion, such that signals from multiple sources may be processed, for example by router 22 of FIG. 1. Conversely, such steering may be used on the transmit side, by control of micromirror array assembly 10 in transmit optical module 5 by control circuitry 14, to transmit signals to multiple receivers in a multiplexed fashion. Further in the alternative, certain ones of mirrors 29 in micromirror array assembly 20 may be rotated to fixedly steer beam B' to photodiode 21, while others of mirrors 29 may be rotated to fixedly steer beam B to photodiode 21; in this case, downstream demodulation or demultiplexing of the light beam sensed by photodiode 21 may be used to separate the signals from the multiple sources, rather than multiplexing by beam aim control. This fixed steering of the beam into two directions may also be performed in transmit optical module 5, with some of the mirrors 29 rotated to reflect the modulated light beam in one direction, and others of the mirrors rotated to reflect the modulated light beam in a different direction, thus facilitating broadcast of a common signal via a modulated light beam to different receivers, or facilitating the transmission of multiple signals to multiple receivers.

Figure 9:
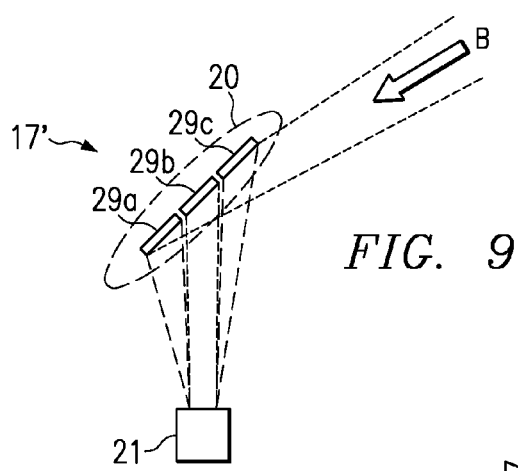
FIG. 9 is a schematic diagram illustrating an alternative mode of operation of a receiver optical module including a micromirror array assembly according to the preferred embodiment of the invention.

According to another alternative, micromirror array assembly 20 may be controlled by control circuitry 24 to fully perform or assist in the focusing of the received modulated light beam. FIG. 9 schematically illustrates this operation, in an example of receiver optical module 17' in which no focusing lens is provided. In this example, individual mirrors 29 are controlled by control circuitry 24 to have different angles of rotation from one another to focus the relatively wide beam B to the smaller photodiode 21. In the example of FIG. 9, mirror 29b is at the center of beam B, and in this case is at or near in its non-rotated position; mirrors 29a, 29c on opposite sides of mirror 29b are rotated in opposite directions, to direct the outer portions of beam B toward photodiode 21. This cooperative control of mirrors 29 focuses beam B to photodiode 21, without the necessity of a lens in receiver optical module 17'. Alternatively, micromirror array assembly 20 may be used to partially focus the beam in this manner, with a smaller lens disposed between assembly 20 and photodiode 21 to complete the focusing.

Figure 10:
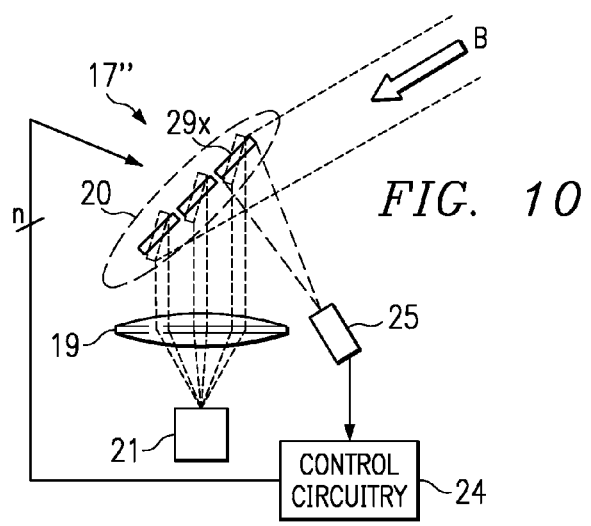
FIG. 10 is a schematic diagram illustrating another alternative mode of operation of a receiver optical module including a micromirror array assembly according to the preferred embodiment of the invention.

Referring now to FIG. 10, receiver optical module 17" according to another alternative operational arrangement is schematically illustrated. In this example, beam quality sensor 25 is provided along with photodiode 21; beam quality sensor 25 itself may also be a photodiode or other sensor for detecting the intensity of incident light. Mirror 29x in micromirror array assembly 21 is controlled by control circuitry 24 (not shown in FIG. 10) to periodically direct incident light to beam quality sensor 25 instead of to lens 19. Beam quality sensor 25 in turn forwards a signal corresponding to the sensed light intensity to control circuitry 24. This periodic sampling of the received light of beam B may then be used by control circuitry 24 to adjust the aim of micromirror array assembly 21 to better steer the incoming modulated light beam B to lens 19.

Further in the alternative, one or more of mirrors 29 may be periodically or constantly controlled to reflect light directly back to the source of the modulated light beam. This reflected light may be detected at the source, for example by one of mirrors 29 in micromirror array assembly 10 in similar fashion as the sampling by mirror 29x of FIG. 10, to adjust the aim of the transmitted modulated light beam. This feedback permits the adjustment of the transmitted beam without requiring communication over a secondary channel, as is typically now carried out in optical wireless networks.

These and other important functions are now enabled by micromirror array assemblies such as those described above. In each case, stronger optical signals may be transmitted, without violating safety or regulatory limits, at relatively low manufacturing cost due to the array of mirrors approach described in this specification. Further, additional functionality such as multiplexed operation, beam focusing, beam quality sensing, and feedback control may be readily carried out through the use of the present invention.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A transmitter optical module, comprising:
   a light source for generating a modulated beam of light;
   a micromirror array assembly, comprising a plurality of micromirrors arranged in an array, for reflecting the modulated light beam; and
   control circuitry for controllably and individually rotating the plurality of micromirrors to direct the reflected modulated light beam in a desired direction;
   a plurality of permanent magnets, at least one permanent magnet coupled to each of the plurality of micromirrors; and
   an array of coil drivers, the coil drivers arranged into a plurality of groups, each group associated with one of the plurality of micromirrors in the array, and mounted to the frame of the plurality of micromirrors so that each group of coil drivers is in proximity to the at least one permanent magnet attached to its associated micromirror; and
   wherein the control circuitry is coupled to each of the coil drivers in the array of coil drivers, for energizing the coil drivers to controllably rotate the plurality of micromirrors to direct the reflected modulated light beam in a desired direction.

2. The transmitter optical module of claim 1, further comprising:
   a lens, disposed between the light source and the micromirror array assembly, for focusing the modulated beam of light.

3. The transmitter optical module of claim 1, wherein the light source comprises a laser.

4. The transmitter optical module of claim 1, wherein the control circuitry is for energizing the coil drivers in a time-multiplexed fashion, to rotate the plurality of mirrors so as to reflect the modulated light beam in first and second selected directions in a time-multiplexed fashion.

5. The transmitter optical module of claim 1, wherein the control circuitry controls a first group of the plurality of micromirrors to direct the modulated light beam in a first direction, and controls a second group of the plurality of micromirrors to direct the modulated light beam in a second direction.

6. The transmitter optical module of claim 1, further comprising at least a second light source for generating a second modulated light beam;
   and wherein the control circuitry is also for controllably and individually rotating the plurality of micromirrors to direct the second modulated light beam in a desired direction.

7. A receiver optical module, comprising:
   a photodetector;
   a micromirror array assembly, comprising a plurality of micromirrors arranged in an array, for reflecting a received modulated light beam; and
   control circuitry for controllably and individually rotating the plurality of micromirrors to reflect the received modulated light beam toward the photodetector;
   a plurality of permanent magnets, at least one permanent magnet coupled to each of the plurality of micromirrors; and
   an array of coil drivers, the coil drivers arranged into a plurality of groups, each group associated with one of the plurality of micromirrors in the array, and mounted to the frame of the plurality of micromirrors so that each group of coil drivers is in proximity to the at least one permanent magnet attached to its associated micromirror;
   wherein the control circuitry is coupled to each of the coil drivers in the array of coil drivers, for energizing the coil drivers to controllably rotate the plurality of micromirrors to reflect the received modulated light beam toward the photodetector.

8. The receiver optical module of claim 7, further comprising:
   a lens, disposed between the micromirror array assembly and the photodetector, for focusing the reflected modulated light beam at the photodetector.

9. The receiver optical module of claim 7, wherein the control circuitry is for energizing the coil drivers to individually rotate the plurality of micromirrors to focus the reflected modulated light beam at the photodetector.

10. The receiver optical module of claim 9, further comprising:
    a lens, disposed between the micromirror array assembly and the photodetector, for further focusing the reflected modulated light beam at the photodetector.

11. The receiver optical module of claim 7, further comprising:
    a beam quality sensor, for sensing light intensity;
    and wherein the control circuitry is for controlling the coil drivers to direct one or more of the micromirrors to reflect the modulated light beam to the beam quality sensor.

12. The receiver optical module of claim 7, wherein the control circuitry is for energizing the coil drivers in a time-multiplexed fashion, to rotate the plurality of mirrors so as to reflect modulated light beams to the photodetector from first and second selected directions in a time-multiplexed fashion.

13. The receiver optical module of claim 7, wherein the control circuitry controls a first group of the plurality of micromirrors to reflect a modulated light beam to the photodetector from a first direction, and controls a second group of the plurality of micromirrors to reflect a modulated light beam to the photodetector from a second direction.

14. An optical wireless transmission system, comprising:
a transmitter, comprising:
- a signal source; and
- a transmitter optical module, comprising:
  - a light source for generating a modulated beam of light;
  - a micromirror array assembly, comprising a plurality of micromirrors arranged in an array, for reflecting the modulated light beam; and
  - control circuitry for controllably and individually rotating the plurality of micromirrors to direct the reflected modulated light beam in a desired direction;
  - plurality of permanent magnets, at least one permanent magnet coupled to each of the plurality of micromirrors; and
  - an array of coil drivers, the coil drivers arranged into a plurality of groups, each group associated with one of the plurality of micromirrors in the array, and mounted to the frame of the plurality of micromirrors so that each group of coil drivers is in proximity to the at least one permanent magnet attached to its associated micromirror;
- wherein the control circuitry is coupled to each of the coil drivers in the array of coil drivers, for energizing the coil drivers to controllably rotate the plurality of micromirrors to direct the reflected modulated light beam in a desired direction;
- a receiver, comprising:
  - a receiver optical module, for receiving a modulated light beam from the transmitter and producing an electrical signal responsive thereto; and
  - a signal destination.

15. The system of claim 14, wherein the signal source comprises a first computer.

16. The system of claim 15, wherein the signal destination comprises a second computer.

17. The system of claim 15, wherein the signal destination comprises a network hub.

18. The system of claim 14, wherein at least one of the transmitter and receiver comprises a multipoint location in the system.

19. The system of claim 14, wherein the transmitter and receiver are each adapted for indoor use.

20. The system of claim 14, wherein the transmitter and receiver are each adapted for outdoor use.

21. The system of claim 14, further comprising at least a second light source for generating a second modulated light beam; and
wherein the control circuitry is also for controllably and individually rotating the plurality of micromirrors to direct the second modulated light beam in a desired direction.

22. An optical wireless transmission system, comprising:
a transmitter, comprising:
- a signal source; and
- a transmitter optical module, for transmitting a modulated light beam; and
a receiver, comprising:
- a receiver optical module, comprising:
  - a photodetector;
  - a micromirror array assembly, comprising a plurality of micromirrors arranged in an array, for reflecting a received modulated light beam; and
  - control circuitry for controllably and individually rotating the plurality of micromirrors to reflect the received modulated light beam toward the photodetector;
  - a plurality of permanent magnets, at least one permanent magnet coupled to each of the plurality of micromirrors; and
  - an array of coil drivers, the coil drivers arranged into a plurality of groups, each group associated with one of the plurality of micromirrors in the array, and mounted to the frame of the plurality of micromirrors so that each group of coil drivers is in proximity to the at least one permanent magnet attached to its associated micromirror;
- wherein the control circuitry is coupled to each of the coil drivers in the array of coil drivers, for energizing the coil drivers to controllably rotate the plurality of micromirrors to reflect the received modulated light beam toward the photodetector; and
- a signal destination.

23. The system of claim 22, wherein the signal source comprises a first computer.

24. The system of claim 23, wherein the signal destination comprises a second computer.

25. The system of claim 23, wherein the signal destination comprises a network hub.

26. The system of claim 22, wherein at least one of the transmitter and receiver comprises a multipoint location in the system.

27. The system of claim 22, wherein the transmitter and receiver are each adapted for indoor use.

28. The system of claim 22, wherein the transmitter and receiver are each adapted for outdoor use.

* * * * *